UNITED STATES PATENT OFFICE.

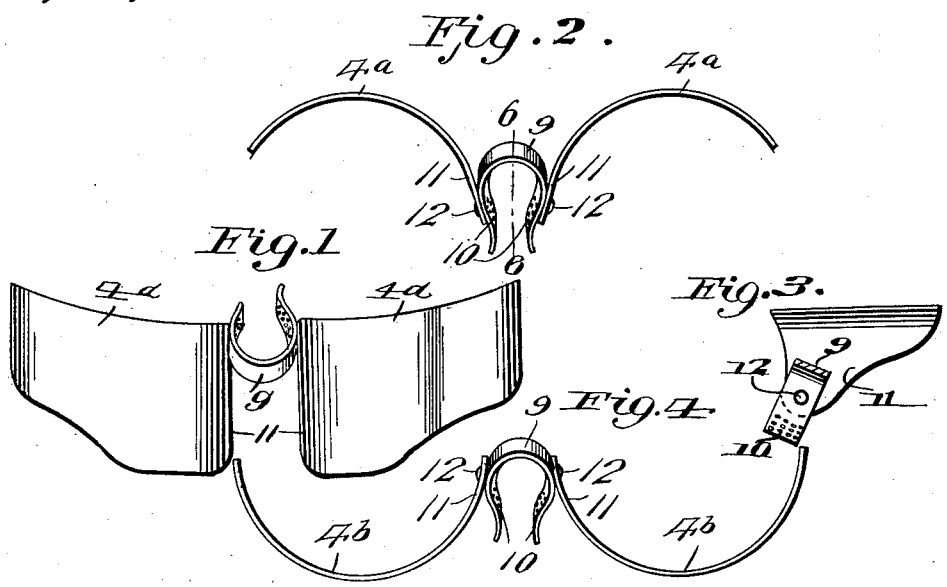

RICHARD GRANT, OF MINNEAPOLIS, MINNESOTA.

EYE-SHADE.

1,097,923.

Specification of Letters Patent. Patented May 26, 1914.

Application filed October 30, 1909. Serial No. 525,453.

*To all whom it may concern:*

Be it known that I, RICHARD GRANT, a citizen of the United States, residing at Minneapolis, in the county of Hennepin and State of Minnesota, have invented new and useful Improvements in Eye-Shades, of which the following is a specification.

This invention relates to eye shades designed for use either independent of or in conjunction with eyeglasses or spectacles to protect the eyes from reflected or refracted light or rays outside of the field of acute vision.

The object of the invention is to provide a shade of this character which is simple of construction, light of weight, durable and efficient in use and inexpensive of production.

In the accompanying drawing, Figure 1 is a top plan view of an eye shade embodying the invention. Fig. 2 is a front view thereof. Fig. 3 is a section on line 6—6 of Fig. 2. Fig. 4 is a view of the form of device shown in Figs. 1, 2 and 3 with the shade members reversed to shut off rays from below instead of above. Fig. 5 is a front view showing a further slightly modified form of construction. Fig. 6 is a section on line 9—9 of Fig. 5.

In carrying my invention into practice, I provide shade members 4ª which are longitudinally curved to suit the contour of the eye and are carried by an intermediate nose piece 9. These shade members may be made of sheet metal, celluloid or other suitable material, and their rear edges are longitudinally curved to conform to the shape of the eyebrow of the wearer against which it bears to obscure light rays from above. The nose piece 9 may be formed of a strip of spring metal or other suitable material having spring action, and it is bent into substantially U-form to engage the nose. The arms of the nose piece are designed in practice to bear upon the opposite sides of the nose similar to the ordinary nose piece of a pair of spectacles and may be smooth-surfaced or provided with perforations or serrations 10 to secure ventilation and adapt the nose piece to more effectually grip the nose. The shade members 4ª are provided at their inner ends with downturned portions or ears 11 which are pivotally attached to the arms of the nose piece by pivot pins 12. These pins connect the shade members with the nose piece in such a manner as to permit said shade members to be adjusted toward or from the eye to obscure light rays coming at different angles and retain the shade members in adjusted position by frictional connection. If desired, however, the pins 12 may rigidly fasten the shade members to the nose piece in either the position shown in Fig. 2 or that shown in Fig. 4 to shield the eyes from light rays from above or below or at different angles to the direct line of vision. The preferred construction, however, is to pivotally connect the shade members to the nose piece so that they may be adjusted to either of such positions at the option of the user.

In the embodiment of the invention disclosed in Figs. 5 and 6, wherein a further modification is shown, each shade member is composed of upper and lower shade pieces 4ª and 4ᵇ arranged to extend above and below the eye and conforming substantially in curvature thereto. These members are provided at their inner ends with ears 13 attached to the nose piece 9 by pins or fastenings 14 which also serve to connect the shade pieces together. These pins may rigidly fasten the shade pieces to each other and to the nose piece, but preferably form a pivotal connection on which the sections or pieces of the shades may be adjusted at different angles to obscure light rays coming from above and below at different angles.

It will be observed from the foregoing description, taken in connection with the drawings, that in each embodiment of the invention I have shown an eye shield composed of members pivotally mounted upon a nose support so that they may be adjusted to lie at different angles to the direct line of vision.

Having thus described the invention, what is claimed as new, is:—

1. An eye shade comprising a nose clamp, shade members, each provided with a longitudinally curved rear bearing edge conforming in contour to and adapted to bear upon the eyebrow, and means pivotally supporting the shade members from the nose clamp for vertical adjustment to lie at different angles to the direct line of vision.

2. An eye shade comprising a nose clamp, shade members each provided with a longitudinally curved rear bearing edge conforming in contour to and adapted to bear upon the eyebrow, and means for pivotally supporting said shade members upon the nose clamp for adjustment above and below and at different angles to the direct line of vision.

In testimony whereof I affix my signature in presence of two witnesses.

RICHARD GRANT.

Witnesses:
JAMES E. TORRENS,
A. H. NELSON.

Copies of this patent may be obtained for five cents each, by addressing the "Commissioner of Patents, Washington, D. C."